Patented May 27, 1930

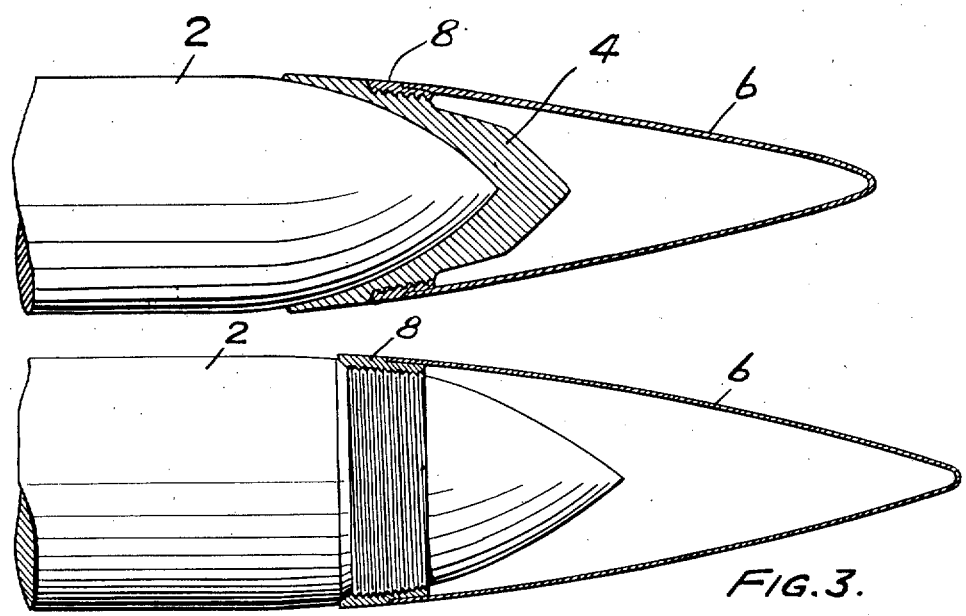
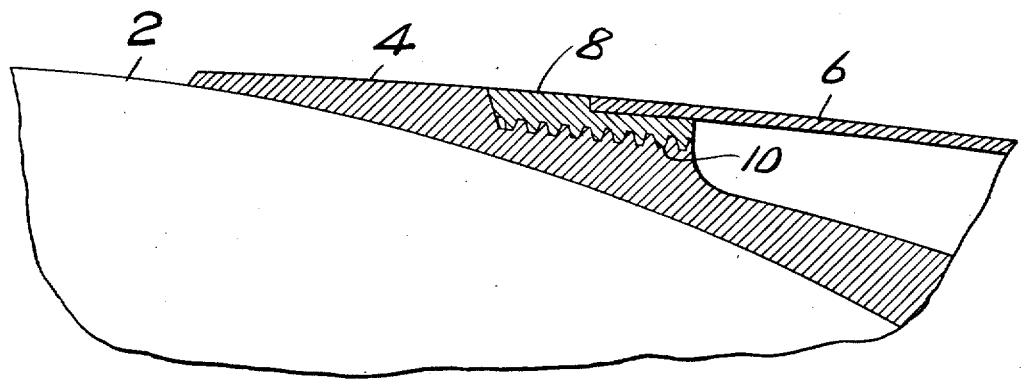

1,760,685

UNITED STATES PATENT OFFICE

JOHN L. COX AND BERNARD M. FINE, OF PHILADELPHIA, PENNSYLVANIA

PROJECTILE

Application filed December 5, 1927. Serial No. 237,655.

This invention relates to a projectile provided with a windshield.

It has been customary to provide projectiles with windshields made of cast or forged metal for the purpose of minimizing wind resistance to the flight of the shell. It is desirable that windshields be removably secured to the projectiles proper. It is found desirable that the windshield be of very light construction, and a suitable type of windshield may be made of drawn steel. However, although it is easy to removably secure to a projectile a machined casting or forging, it is difficult to removably secure to a projectile a drawn steel windshield due to the fact that the walls are relatively thin and of substantially uniform thickness. It is the object of the present invention to provide a satisfactory means for attaching a windshield of drawn steel to a projectile, which means will prevent displacement of the windshield during handling of the projectile or during its flight.

In the drawing:

Fig. 1 is a sectional view showing the point of a capped shell provided with the improved windshield; and Fig. 2 is an enlarged detail of Fig. 1.

Fig. 3 is a view with only the windshield in section.

A projectile having a body 2 is provided with a cap 4 of any desired type, which may be secured to the shell in any suitable manner. A windshield 6 made of drawn steel and having relatively thin walls of substantially uniform thickness covers the forward portion of the cap and acts to diminish the resistance of the air to the flight of the projectile. This windshield 6 is secured by any suitable means, such as welding, soldering, riveting, or the like, to a metallic ring 8 considerably thicker than the windshield walls. This ring 8 and the cap 8 are provided with interengaging screw threads, as indicated at 10, whereby the windshield and the ring may be screwed as a unit on or off the cap. It will be clear, of course, that instead of securing the windshield to the cap, it might be secured through ring 8 directly to the walls of the shell, as shown in Fig. 3. Ring 8 may be secured against rotation to prevent accidental displacement or removal of the windshield, by means of pins or set screws, or by forcing metal of one part into a notch or notches in the other.

It will be clear that the foregoing construction provides a practical and readily constructed means for securing a thin windshield to a projectile so that the windshield may be readily removed therefrom, as is frequently necessary.

What we claim is:

1. A projectile having a circumferential forwardly facing shoulder, in combination with a windshield of drawn steel whose rear end is of substantially no greater thickness than its main body and a ring permanently secured to the rear end thereof, said ring having an interior thread engaging an exterior thread on the projectile and abutting against said shoulder.

2. A projectile having a forwardly projecting circumferential shoulder in combination with a hollow windshield having permanently secured at the rear end thereof a ring extending within the inner wall of the windshield and a part extending in line with the body of the windshield and back of the rear circumferential edge thereof, said ring being threaded on the projectile in front of the shoulder thereon.

3. A projectile having a circumferential forwardly facing shoulder, in combination with a windshield and a ring fixedly secured to the rear end of the windshield, said projectile having a circumferential forwardly facing shoulder and said ring having also a forwardly facing shoulder; the front part of said ring extending within the rear end portion of the windshield so that the rear extremity of the windshield abuts against the shoulder on the ring, the rear end of the ring abutting against the shoulder on the projectile, the ring being threaded on the projectile, and the outer faces of the windshield, ring and projectile being substantially flush one with another.

4. A projectile comprising a body and a cap covering the point of the body, and having a circumferential forwardly facing shoulder, in combination with a windshield of drawn steel whose rear end is of substantially no greater thickness than its main body and a ring permanently secured to the rear end thereof, said ring having an interior thread engaging an exterior thread on the cap and abutting against said shoulder.

5. A projectile comprising a body and a cap covering the point of the body, in combination with a windshield and a ring fixedly secured to the rear end thereof, said cap being provided with a circumferential open front recess having a lengthwise extension and depth substantially corresponding to the length and depth of the ring and provided with a rear shoulder, said ring being threaded on the recessed part of the cap and abutting at its rear end against said shoulder.

6. A windshield for a projectile, said windshield comprising a body of comparatively thin material and a comparatively thick base ring having a forwardly facing shoulder against which the rear of the windshield body abuts, the windshield body being fixedly secured to the base ring and the base ring being screw threaded on its interior to adapt it for detachable connection with a projectile.

7. A windshield for a projectile, said windshield comprising a body of comparatively thin material and a comparatively thick base ring having a forwardly facing shoulder against which the rear of the windshield body abuts, the forward portion of the base ring extending within the rear end of the windshield body and the exterior of the windshield body and the exterior of the base ring back of the shoulder being flush one with another, the windshield body and base ring being fixedly secured together, and the interior of the base ring having a screw thread adapting it for detachable connection with a projectile.

8. A projectile provided with a circumferential open front recess threaded on its peripheral face and having a rear shoulder, in combination with a windshield body of comparative thin material and a base ring of comparatively thick material, secured to, and extending behind, the rear end of the windshield body, said base ring being interiorly threaded to adapt it to be positioned in, and threaded on the peripheral face of, said recess with its rear end abutting against said shoulder.

In testimony of which invention, we have hereunto set our hands, at Philadelphia, Pennsylvania, on this thirtieth day of November, 1927.

JOHN L. COX.
BERNARD M. FINE.